(12) United States Patent
Madsen (10) Patent No.: US 9,174,723 B2
(45) Date of Patent: Nov. 3, 2015

(54) SHAPE MEMORY ALLOY RODS FOR ACTUATION OF CONTINUOUS SURFACES

(71) Applicant: The Boeing Company, Chicago, IL (US)

(72) Inventor: Casey Lyn Madsen, Normandy Park, WA (US)

(73) Assignee: The Boeing Company, Chicago, IL (US)

( * ) Notice: Subject to any disclaimer, the term of this patent is extended or adjusted under 35 U.S.C. 154(b) by 335 days.

(21) Appl. No.: 13/855,942

(22) Filed: Apr. 3, 2013

(65) Prior Publication Data
US 2015/0129715 A1    May 14, 2015

(51) Int. Cl.
| B64C 3/48 | (2006.01) |
| B64C 9/02 | (2006.01) |
| B64C 7/00 | (2006.01) |
| B64C 13/30 | (2006.01) |
| B64C 9/00 | (2006.01) |

(52) U.S. Cl.
CPC . B64C 13/30 (2013.01); B64C 7/00 (2013.01); B64C 9/02 (2013.01); B64C 3/48 (2013.01); B64C 2009/005 (2013.01); Y02T 50/32 (2013.01)

(58) Field of Classification Search
CPC .............. B64C 3/48; B64C 3/50; B64C 3/52; B64C 2027/7288; B64C 2003/445; Y02T 50/145
See application file for complete search history.

(56) References Cited

U.S. PATENT DOCUMENTS

| 4,349,169 | A | * | 9/1982 | McAnally ...................... 244/219 |
| 5,222,699 | A | | 6/1993 | Albach et al. |
| 5,794,893 | A | | 8/1998 | Diller et al. |
| 5,839,698 | A | | 11/1998 | Moppert |
| 5,931,422 | A | * | 8/1999 | Geiger et al. ................. 244/214 |
| 6,089,505 | A | | 7/2000 | Gruensfelder et al. |
| 6,164,598 | A | * | 12/2000 | Young et al. .................. 244/212 |
| 6,209,824 | B1 | | 4/2001 | Caton et al. |
| 6,213,433 | B1 | | 4/2001 | Gruensfelder et al. |
| 6,349,903 | B2 | | 2/2002 | Caton et al. |
| 6,571,820 | B2 | * | 6/2003 | Glovatsky et al. ............ 137/353 |
| 6,575,407 | B2 | * | 6/2003 | McCallum et al. ........... 244/133 |

(Continued)

OTHER PUBLICATIONS

Partial European Search Report, European Application No. 14161800.9 (foreign counterpart of instant application), dated Sep. 8, 2014.

(Continued)

*Primary Examiner* — Tien Dinh
*Assistant Examiner* — Richard R Green
(74) *Attorney, Agent, or Firm* — Ostrager Chong Flaherty & Broitman P.C.

(57) ABSTRACT

A system for connecting two relatively movable structures on an aircraft, comprising: a first rigid structure attached to one of the relatively movable rigid structures; a second rigid structure attached to another of the relatively movable structures; a flexible skin connected to the first and second rigid structures; a sleeve comprising first and second end portions; a first rod comprising a first end portion attached to the first rigid structure, a second end portion slidably coupled to the first end portion of the sleeve, and an intermediate portion made of shape memory alloy; a second rod comprising a first end portion attached to the second rigid structure, a second end portion slidably coupled to the second end portion of the sleeve, and an intermediate portion made of shape memory alloy; and means for heating at least the intermediate portions of the first and second rods.

18 Claims, 4 Drawing Sheets

(56) References Cited

U.S. PATENT DOCUMENTS 6,588,709 B1 7/2003 Dunne et al.
7,464,548 B2 * 12/2008 Yson et al. .................... 60/527
8,118,264 B2 2/2012 Mabe et al.
8,342,447 B2 1/2013 Etling
2012/0282474 A1 11/2012 Madsen et al.

OTHER PUBLICATIONS

Extended European Search Report, European Application No. 14161800.9 (foreign counterpart of instant application), dated Feb. 11, 2015.

* cited by examiner

SHAPE MEMORY ALLOY RODS FOR ACTUATION OF CONTINUOUS SURFACES

BACKGROUND

The present disclosure relates generally to aerodynamic surfaces and, more particularly, to continuous surfaces for eliminating gaps between relatively movable components of a flight vehicle.

Conventional aircraft typically include a variety of movable aerodynamic devices for controlling the pitch, yaw and roll of the aircraft and for altering the lift characteristics of the aircraft. For example, fixed wing aircraft may include ailerons mounted to the trailing edge of the wings for roll control of the aircraft. The wings may also include flaps or slats mounted to the leading edge of the wings and which may be deployed or deflected downwardly from the wings during certain phases of flight in order to maintain airflow over the wing at high angles of attack.

Flaps may be also mounted to the trailing edges of the wings to increase the amount of lift generated by the wings when the aircraft is moving through the air at relatively slow speeds. Trailing edge flaps are typically deflected downwardly during takeoff to increase lift and are then retracted during the cruise portion of a flight. The flaps may again be deflected downwardly during the approach and landing phases of the flight to reduce the landing speed of the aircraft.

Although generally effective for reducing the landing speed of an aircraft, the deflection of conventional flaps may produce several undesirable effects, Such undesirable effects may be attributed to gaps that are created between the side edges of the deployed flaps and the wings. For example, the flow of air around the relatively sharp side edges of a deflected flap may result in formation of vortices along the side edges. Such vortices may increase the aerodynamic drag of the flap, which may reduce the aerodynamic efficiency of the wing. The vortices may also cause vibration and flutter in the flap, which may have an undesirable effect on the flap actuation mechanism.

Even further, vortices that may form along the side edge of a deflected flap may generate a significant amount of noise. Although flap noise may have minimal impact when the aircraft is at high altitudes or is flying over unpopulated areas, the noise generated by deployed flaps may have a greater impact when the aircraft is near populated areas located underneath the landing pattern of an airport. In this regard, flap noise may comprise a significant portion of the overall noise generated by the aircraft during the approach and landing phases of flight when the engines are typically idling.

Continuous mold lines have been considered for use between a wing and the edge of a flap. The continuous mold line provides a continuous surface between the wing and the flap edge to reduce noise caused by air passing by a gap formed between the wing and the flap edge. Such continuous mold lines included flexible rods (made, e.g., of quartz, epoxy or composites) embedded in an elastomeric skin.

However, these continuous mold lines were employed in conjunction with relatively large actuators which bend the flexible rods and overcome the biasing force of the elastomer. For example, the actuation mechanism may comprise a rigid plunger that moves the control surface in response to an actuation force produced mechanically, electromechanically or hydraulically. The drawback to this is that such actuators are sized for the specific loads and power required to move the control surface and would need to be sized much larger to apply the force necessary to move an attached continuous surface.

Another drawback is the poor performance of elastomeric skins in cold temperatures. In low temperatures (i.e., at altitude), the elastomer can lose some flexibility and not immediately return to its original, non-deformed shape.

More recently, fiberglass strands were used in place of the flexible rods. However, the use of fiberglass strands does not overcome the large actuator and cold temperature issues.

Accordingly, there is a need for improved systems and methods for employing continuous surface technology on aircraft which do not require large actuators and in which the elastomeric skins perform better in cold temperatures.

SUMMARY

The subject matter disclosed herein is directed to improved connection assemblies for employing continuous surface technology to connect relatively movable structures of an aircraft without the aforementioned drawbacks (i.e., large actuators and poor performance at cold temperatures). The connection assemblies disclosed herein use shape memory alloy rods in a continuous mold line (also known as "a continuous surface"). The rods are disposed inside a flexible skin of the continuous mold line, which skin may comprise elastomeric material, fabric or other flexible material. The shape memory alloy provides its own actuation force so an additional source, such as a hydraulic actuator, is not needed. The shape memory alloy actuation force would alleviate the drain on actuators for flap and rudder systems and allow the reduction in actuator size while providing continuous moldline benefits such as noise reduction and drag reduction. Additionally, the shape memory alloy rods would facilitate the use of continuous surface technology because they perform well at low temperature. The use of shape memory alloy rods eliminates the need for a hydraulic actuator for the continuous mold line and facilitates warming the flexible skin of the continuous mold line so that the continuous surface will function properly.

In accordance with some embodiments, the continuous mold line comprises a multiplicity of telescoping rod/sleeve/rod assemblies embedded in a flexible skin that connects two fixed rod blocks. Each telescoping rod/sleeve/rod assembly comprises one rod having one end which is slidable inside one end of a metal sleeve and another end which is attached to one rod block, and another rod having one end which is slidable inside the other end of the metal sleeve and another end which is attached to the other rod block. The active portion of each shape memory alloy rod (not including rod portions inside the sleeve and rod portions attached to the rod block) is heated by a respective heater to bend (deform) each rod from an original shape (i.e., unactuated state) to a deformed shape (i.e., actuated state). When the shape memory alloy rods are actuated, the rods deform the flexible skin that forms the continuous surface between two aircraft components, at least one of which is movable relative to the other. To return the shape memory alloy rods to their original shape and undeform the flexible skin, the heating of the rods is discontinued, allowing the rods to cool and return to their undeformed states. This can be accomplished by training the shape memory alloy rods to have a two-way memory effect. The two-way shape-memory effect is the effect that the material remembers two different shapes: one at low temperatures and another at high temperature, i.e., the material shows a shape memory effect during both heating and cooling.

One aspect of the subject matter disclosed herein is an assembly for connecting two relatively movable structures on an aircraft, comprising: first and second rigid structures; a flexible skin connected to the first rigid structure and to the second rigid structure; and a first rod having a first end portion attached to the first rigid structure, the first rod comprising shape memory alloy in at least an intermediate portion thereof and having a cross-sectional measurement of at least 0.1 inch. The assembly may further comprise: a sleeve having first and second end portions; and a second rod having a first end portion connected to the second rigid structure, the second rod comprising shape memory alloy in at least an intermediate portion thereof, wherein a second end portion of the first rod is slidably coupled to the first end portion of the sleeve, and a second end portion of the second rod is slidably coupled to the second end portion of the sleeve. The flexible skin may be made of elastomeric material or fabric. The first rod will have a first shape when the intermediate portion of the first rod is heated and a second shape when the intermediate portion of the first rod is cooled, the second shape being different than the first state.

Another aspect of the disclosed subject matter is a system for connecting two relatively movable structures on an aircraft, comprising: a first rigid structure attached to one of the relatively movable structures; a second rigid structure attached to another of the relatively movable structures; a flexible skin connected to the first and second rigid structures; a sleeve comprising first and second end portions; a first rod comprising a first end portion attached to the first rigid structure, a second end portion slidably coupled to the first end portion of the sleeve, and an intermediate portion made of shape memory alloy; a second rod comprising a first end portion attached to the second rigid structure, a second end portion slidably coupled to the second end portion of the sleeve, and an intermediate portion made of shape memory alloy; and means for heating at least the intermediate portions of the first and second rods. Preferably, each of the first and second rods has a cross-sectional measurement in a range of 0.1 to 0.5 inch.

A further aspect is an aircraft comprising: a first structure comprising a relatively rigid skin; a second structure comprising a relatively rigid skin, at least one of the first and second structures being movable relative to the other; and a connection assembly having a first end connected to the rigid skin of the first structure and a second end connected to the rigid skin of the second structure. The connection assembly comprises: a flexible skin, a sleeve comprising first and second end portions, a first rod comprising a first end portion slidably disposed inside the first end portion of the sleeve, and a second rod comprising a first end portion slidably disposed inside the second end portion of the sleeve. Each of the first and second rods comprises shape memory alloy. The flexible skin of the connection assembly and the relatively rigid skins of the first and second structures define a continuous surface. Each rod has a first shape when an intermediate portion of the rod is heated and a second shape when the intermediate portion of the rod is cooled, the second shape being different than the first state.

Yet another aspect of the disclosed subject matter is an aircraft comprising first and second structures and a connection assembly connecting the first and second structures to each other, the connection assembly comprising: a first rod block attached to the first structure; a second rod block attached to the second structure; a flexible skin having one end connected to the first rod block and another end connected to the second rod block; and a plurality of assemblies disposed within or adjacent to the flexible skin. Each assembly comprises: a sleeve; and a first rod comprising a first portion slidably coupled to the sleeve, a second portion attached to the first rod block, and a third portion disposed between the first and second portions of the first rod, wherein the third portion of the first rod comprises shape memory alloy trained to produce a two-way memory effect in response to heating and cooling. Each assembly may further comprise a second rod comprising a first portion slidably coupled to the sleeve, a second portion attached to the second rod block, and a third portion disposed between the first and second portions of the second rod, wherein the third portion of the second rod comprises shape memory alloy trained to produce a two-way memory effect in response to heating and cooling. The aircraft further comprises means for heating the shape memory alloy of the first and second rods.

Other aspects are disclosed below.

BRIEF DESCRIPTION OF THE DRAWINGS

Reference will hereinafter be made to the drawings in which similar elements in different drawings bear the same reference numerals.

DETAILED DESCRIPTION

Figure 1:
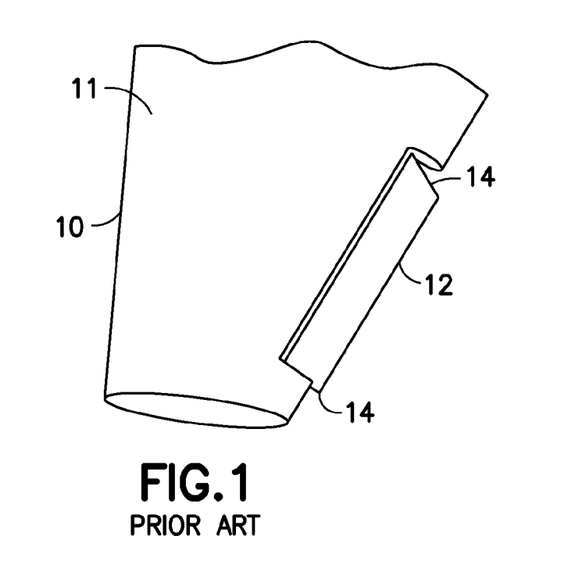
FIG. 1 is a diagram showing an isometric view of a portion of a prior art aircraft wing having a control surface pivotably coupled to its trailing edge. The side edges of the control surface are not connected to the wing by means of continuous surfaces, thereby creating gaps between the sides of the control surface and opposing portions of the wing.

FIG. 1 shows an isometric view of a portion of a prior art aircraft wing 10 having a top skin 11 and having a control surface 12 pivotably coupled to a portion of the wing's trailing edge. The side edges 14 of the control surface 12 are not connected to the wing 10 by means of continuous surfaces, thereby creating gaps between the side edges 14 of the control surface 12 and opposing portions of the wing 10. These gaps tend to increase noise and drag during flight.

An aircraft has a multiplicity of movable structures such as aerodynamic control devices that may be mounted at any one of a variety of locations on the aircraft. For example, the movable structures may comprise ailerons mounted to the fixed structure of the aircraft wings at the trailing edges thereof. Similarly, the aircraft may include movable structures comprising slats or flaps that may be mounted to the leading edges of the wings. The movable structures may further comprise flaps that may be mounted to the trailing edges of the wings.

Advantageously, an activatable and deformable continuous surface may be connected between each movable structure (ailerons, flaps, etc.) and the adjacent fixed structure (e.g., a fixed wing or a fuselage) to provide a continuous contour therebetween regardless of the position of the movable structure. Such a continuous surface maintains continuity between confronting edges of a movable structure and a fixed structure, thereby eliminating any gap therebetween regardless of the relative position of the movable structure.

In accordance with further alternatives, an activatable and deformable continuous surface may be installed between the side edges of an elevator and the adjacent side edges of a horizontal stabilizer on which the elevator is mounted, or between upper and lower edges of a rudder and the adjacent upper and lower edges of a vertical stabilizer on which the rudder is mounted.

Alternatively, an activatable and deformable continuous surface may be connected between a pair of movable structures to provide a continuous contour therebetween regardless of the relative positions of the movable structures. For example, the wing trailing edge may include an aileron and a flap or inboard and outboard flaps mounted in a side-by-side arrangement. In such a case, a continuous surface may be installed between the adjacent side edges of the aileron and flap or the inboard and outboard flaps.

Figure 2:
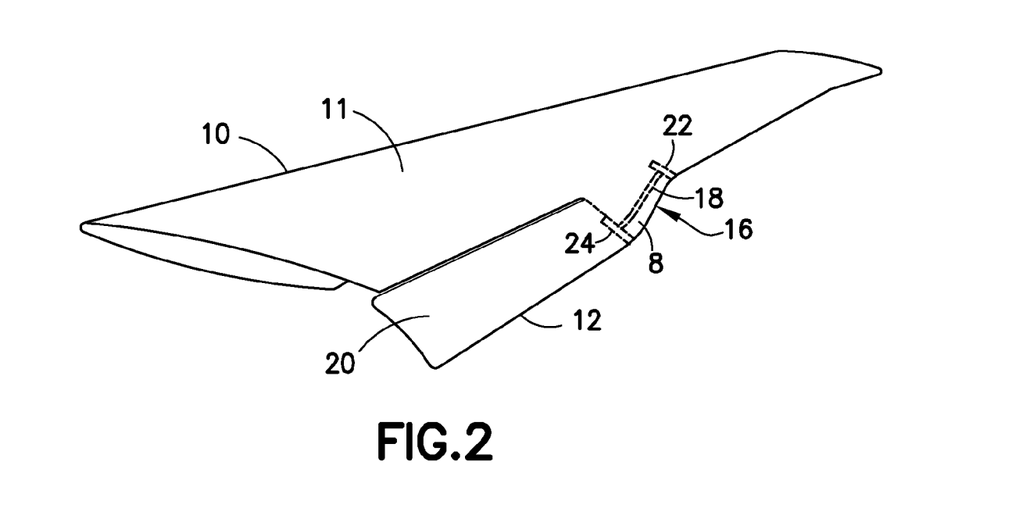
FIG. 2 is a diagram showing an outboard portion of a wing having a control surface coupled thereto in accordance with one embodiment. Only an outboard portion of the control surface is shown, that portion being connected to the wing by means of upper and lower connection assemblies that form continuous surfaces. (Only the upper connection assembly is visible in FIG. 2.)

FIG. 2 shows an isometric view of a portion of a control surface 12 pivotably coupled to a portion of the trailing edge of a wing 10. The control surface 12 is shown in a deployed state. The wing 10 has a top skin 11, while control surface 12 has a top skin 20. In accordance with one embodiment, each side of the control surface 12 (only the outboard side of the control surface is shown in FIG. 2) is connected to wing 10 by means of upper and lower connection assemblies. Only the upper connection assembly 16 is visible in FIG. 2, the lower connection assembly for the outboard side of control surface 12 being disposed directly below upper connection assembly 16.

In accordance with one embodiment of the concept disclosed herein, upper connection assembly 16 comprises a flexible skin 8 and an array of telescoping rod/sleeve/rod assemblies in contact with and disposed below the top surface of the flexible skin 8. In the view of FIG. 2, the telescoping rod/sleeve/rod assemblies are hidden from view, but the position of one telescoping rod/sleeve/rod assembly 18 is indicated by dashed lines for the purpose of illustration. The upper connection assembly 16 further comprises a first rod block 22 attached to the outboard edge of control surface 12 and a second rod block 24 attached to an opposing edge of wing 10. One end of flexible skin 8 is attached to the first rod block 22, while the other end of flexible skin 8 is attached to the second rod block 24. The flexible skin 8 connects the top skins 11 and 20 of the control surface and wing respectively to provide an upper continuous surface which extends from one edge of wing 10 to the outboard edge of control surface 12. That continuous surface comprises the top skin 20 of the control surface 12, flexible skin 8 of the connection assembly 16, and the top skin 11 of the wing 10.

The lower connection assembly (not visible in FIG. 2) may have the same construction as upper connection assembly 16. Likewise the upper and lower connection assemblies connected to the inboard edge (not shown in FIG. 2) of control surface 12 may have a similar construction. The flexible skins of the upper and lower connection assemblies on each side of the control surface 12 depicted in FIG. 3 eliminate the adverse effects of the gaps adjacent to side edges 14 of the control surface 12 depicted in FIG. 1

Figure 3:
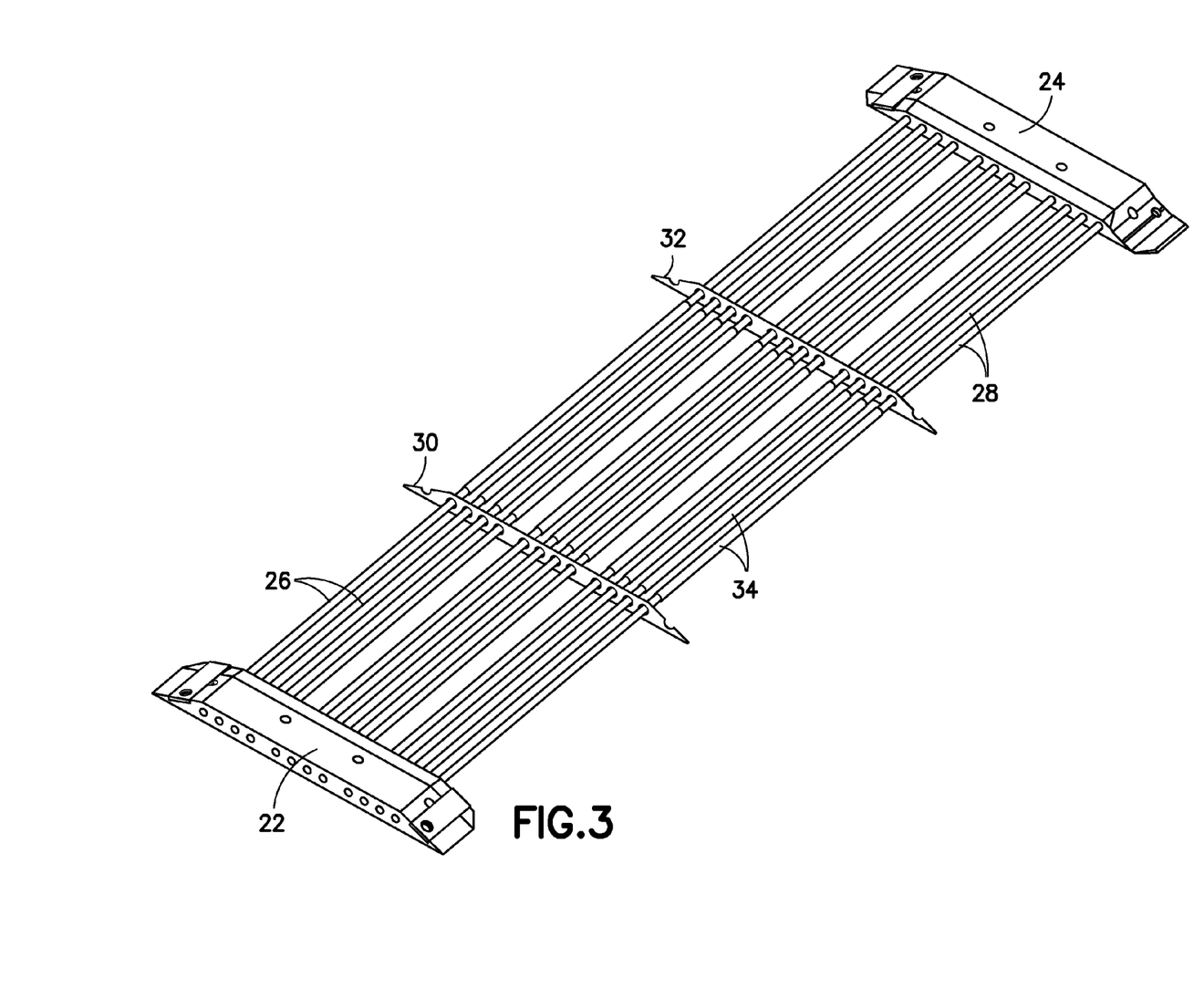
FIG. 3 is a diagram showing an isometric view of a connection assembly in accordance with one embodiment, with the flexible skin removed to reveal internal components. The connection assembly comprises shape memory alloy rods shown in their cooled (i.e., undeformed) states.

In accordance with one implementation, each continuous mold line for connecting two structures (at least one of which is movable relative to the other) can be formed by a connection assembly which comprises a flexible skin made of elastomeric material. FIG. 3 shows an isometric view of a connection assembly whose elastomeric skin has been removed to reveal the other components of the connection assembly. In addition to the elastomeric skin, this connection assembly comprises first and second rod blocks 22 and 24 (which will be respectively fastened to the two structures) and a plurality of telescoping rod/sleeve/rod assemblies (which will be embedded in the sheet of elastomeric material that forms the flexible skin).

If the elastomeric skin were depicted in FIG. 3, the resulting connection assembly would have the appearance of a panel. During installation, the forward or leading edge of upper and lower panels are connected to each other by a nosepiece (not shown) and are not attached to the wing by hardware (e.g., rod blocks, hinges, bolts, etc.). The gap between each connection assembly and the wing can be covered by extending the elastomeric skin (or fabric) to provide a continuous surface.

Still referring to FIG. 3, each telescoping rod/sleeve/rod assembly comprises: a straight metal sleeve 34 (e.g., a circular cylindrical tube) having first and second end portions; a first rod 26 having a first end portion slidably coupled to the first end portion of the sleeve 34 and a second end portion attached to the first rod block 22; and a second rod 28 having a first end portion slidably coupled to the second end portion of the sleeve 34 and a second end portion attached to the second rod block 24. Each rod is a solid circular cylinder made of shape memory alloy. The outer diameter of the rods is slightly less than the inner diameter of the sleeves, so that the first end portion of each rod is freely slidable inside its associated sleeve while an intermediate portion of the rod changes shape.

The rods 26, 28 also translate relative to a pair of ribs 30 and 32 (not shown in FIG. 3) during heating and cooling. The first plurality of rods 26 respectively pass through a plurality of holes formed in a first rib 30, while the second plurality of rods 28 respectively pass through a plurality of holes formed in a second rib 32. Ribs 30, 32 are embedded in the elastomeric skin. Because of the curing process during fabrication, the ribs are bonded to the elastomer. The rib height is less than the thickness of the elastomeric skin. In addition, the ribs 30, 32 are thin, the stiffness of the elastomer being much greater than the stiffness of the ribs, so that the ribs move (i.e., bend or flex) relative to the motion of the continuous mold line. The elastomer "pulls" the ribs 30, 32 along as the entire continuous mold line is moved. Since the ribs are not rigidly attached to another structure and "float" in the elastomer, the ribs are free to bend or flex as the motion of the continuous mold line requires. The rods are not attached to the ribs, but rather the ribs are used as guides for the rods both during lay-up (i.e., fabrication) and actuated motion. Ribs 30, 32 also serve as spacers to maintain the spacing between the sleeves 34.

The end portions of each shape memory alloy rod are not trained to produce any memory effect during heating or cooling. The rod end portions which are slidably coupled to the sleeves 34 maintain a straight state to facilitate sliding inside but the sleeve, while the other rod end portions are fastened to and disposed inside the rod blocks 22, 24. In contrast an intermediate (i.e., active) portion of each rod (i.e., the portion between the opposing end portions) is trained to produce a two-way memory effect in response to heating and cooling. FIG. 3 shows first and second pluralities of straight rods 26 and 28 in their cooled (i.e., undeformed) states. In this embodiment, the shape memory alloy rods of the connection assembly are trained to bend (deform) in unison (optionally, to different degrees) during heating and then return to their undeformed state during cooling.

It should be appreciated that the shape memory rods must be trained in accordance with the constrained motion they must produce, which in turn depends on the relative movements of the structures being connected by a continuous surface. For example, the rotational/translational motion of a flap relative to a wing is dependent on which flight control system is installed on the aircraft. More specifically, some aircraft have a rather complex motion with translational and rotational components, while other aircraft have a simpler flap translation (without a complicated rotational component). The motion problem can be solved with training the rods to bend different degrees. For example, the rods at the leading edge of the continuous mold line would be trained to bend half the amount (e.g., 20 degrees) rather than 40 degrees required for the aft edge of the continuous mold line. The shape metal alloy rods can be trained for different degrees of motion based on designs of different "trainers" (mechanical mechanisms used to train a shape metal alloy to maintain its memory shape.)

Figure 4:
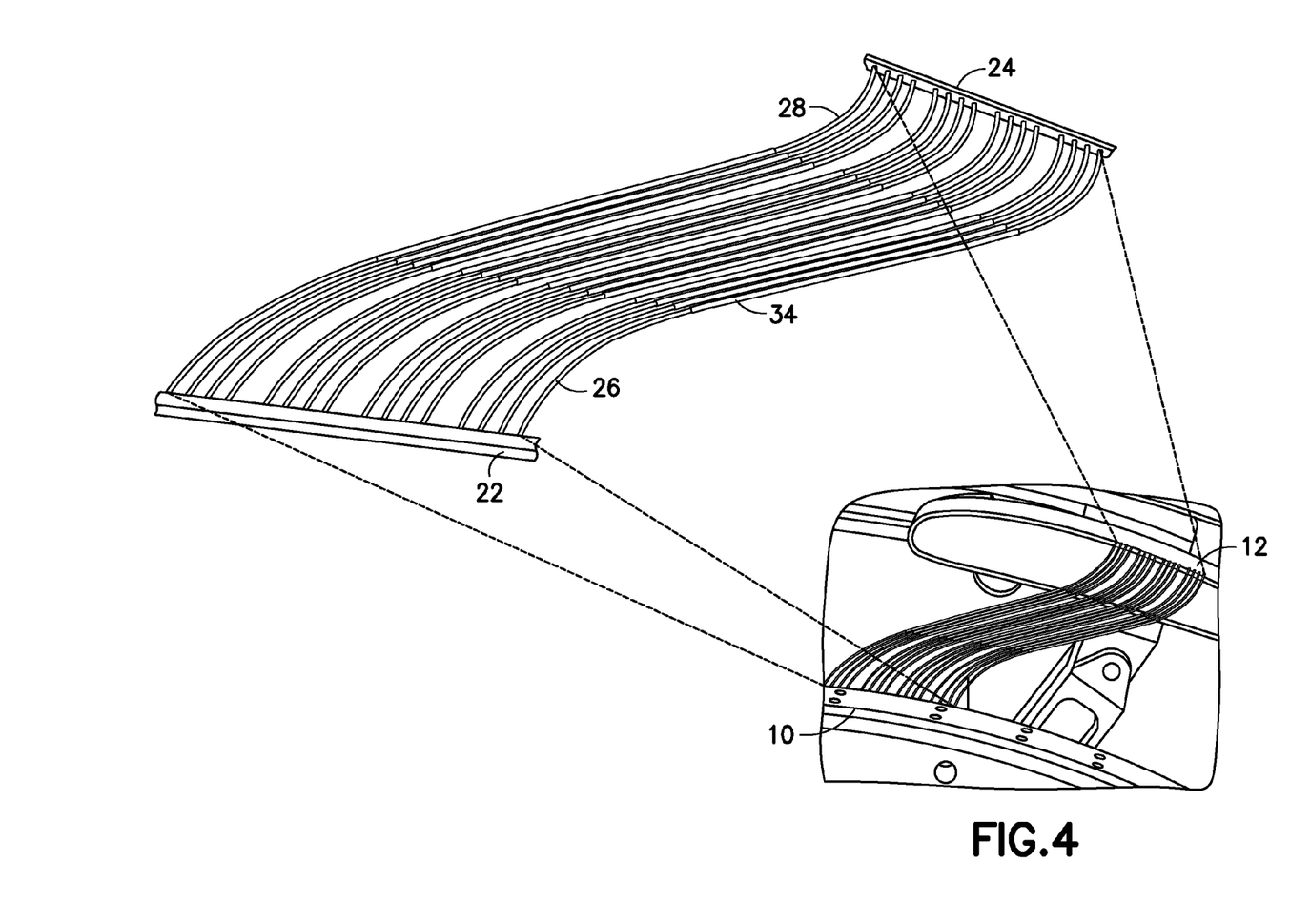
FIG. 4 is a diagram showing an isometric view showing portions of a control surface and a wing connected by a set of shape memory alloy rods of a connection assembly similar to the one depicted in FIG. 3. In this scenario, the shape memory alloy rods are shown in their heated (i.e., deformed) states.

FIG. 4 again depicts a connection assembly whose elastomeric skin has been removed to reveal the other components of the connection assembly. The connection assembly comprises a plurality of rod/sleeve/rod assemblies which connect a rod block 22 (attached to one side edge of a control surface 12) to a rod block 24 (attached to an edge of a wing 10). In this example, rods 26 have been trained to bend (deform) to the same first shape during heating, while rods 28 have been trained to bend (deform) to the same second shape during heating. (As used herein, the terms "first shape" and "second shape" should not be construed in a manner that would exclude them being the same shape.) FIG. 4 shows the rods 26 and 28 in their heated (i.e., bent or deformed) states.

Equal bending of the rods in each row could be used, for example, in a flight control system wherein a control surface translates relative to the wing with little rotation. In such cases, as the continuous mold line is moving, one end of each rod is translating aft by the same amount because those ends are all affixed to the same rod block, so the rods fastened to that rod block will all bend with the same motion.

As seen in FIG. 4, the sleeves 34 remain straight while the rods 26, 28 bend. The rod end portions which slide in and out of the sleeves 34 also remain straight (i.e., they have not been trained to bend during heating or cooling). Those end portions of the shape memory alloy rods are coated with lubricant to allow the end portions to slide in and out of the sleeves more easily while the rods transform. Likewise the end portions fastened to the rod blocks 22, 24 have not been trained to bend during heating or cooling. Only the intermediate portion of each rod have been trained to provide a two-way memory effect, bending in one direction during heating and bending back to its previous position and shape during cooling. The intermediate portion of a shape memory alloy rod that bends is called the "active length", while the total length of the shape memory alloy rod is greater than the active length.

Figure 5:
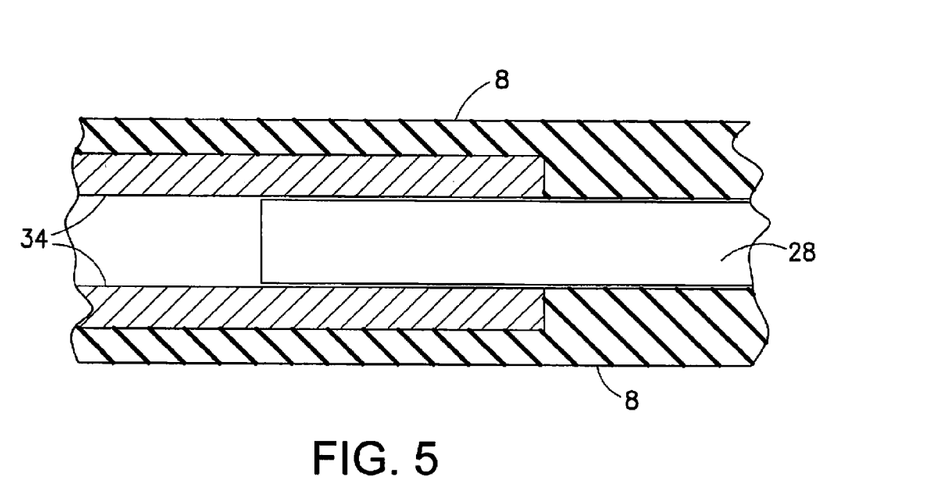
FIG. 5 is a diagram showing a partially sectional view of one end of a shape memory alloy rod slidably coupled to a metal sleeve, both being embedded in a flexible skin made of elastomeric material.

FIG. 5 shows a partially sectional view of one end portion of a circular cylindrical shape memory alloy rod 28 slidably coupled to one end portion of a circular cylindrical metal sleeve 34, both being embedded in a flexible skin 8 made of elastomeric material. For the rods to slide into and out of the sleeves quickly and effectively, friction should be at a minimum. The end portion of rod 28 which slides inside metal sleeve 34 may be coated with lubricant to facilitate sliding into and out of the open end of the sleeve. Preferably, each shape memory alloy rod 28 has a diameter in the range of 0.1 to 0.5 inch (inclusive) to provide sufficient structural support and also to provide outer peripheral surface areas large enough to transfer sufficient heat from the rods to warm the flexible skin in contact therewith. The rods and sleeves could have other complementary cross-sectional shapes, but a circular cross section minimizes friction at the rod/sleeve/rod interface during sliding. Unlike the ribs previously described (see ribs 30, 32 in FIG. 3), the shape memory alloy rod 28 is movable relative to (and not bonded to) the flexible skin 8.

In accordance with one implementation, the metal sleeve 34 is made of stainless steel and the flexible skin 8 is a sheet of elastomeric material that is capable of stretching to 100% of its unstressed length. In addition, the elastomeric skin is capable of twisting.

In accordance with alternative embodiments, the flexible skin 8 may comprise a layer of fabric (e.g., a high-strain knit fabric) or a sheet or layer of other flexible material having sufficient stretchability and ruggedness. In these instances, the fabric provides a stretchable covering that does not contact the rods. Likewise the sleeves can be made of a metal alloy different than stainless steel.

The two main types of shape-memory alloys are copper-aluminum-nickel, and nickel-titanium (nitinol) alloys but shape memory alloys can also be created by alloying zinc, copper, gold, and iron. In various embodiments, the rods can be made of nitinol, though various other shape memory alloys of copper, zinc, aluminum, nickel, titanium, palladium, and/or other materials can be used as well. The transition temperature of a shape memory alloy is highly sensitive to the composition of the alloy and can be selected by slightly varying the constituent ratios. The choice of material for the rods can be made based upon various design considerations such as operating temperature ranges, desired transition temperatures, desired transition times, combinations thereof, and the like.

More particularly, in some embodiments, the rods are formed from "nitinol 55", a binary form of nitinol that is 55% by weight nickel. It should be understood that this embodiment is illustrative, and should not be construed as being limiting in any way. For example, in some contemplated embodiments, the rod can be formed from two or more alloys, wherein at least one of the alloys is a shape memory alloy and at least one of the alloys is not a shape memory alloy, such as steel, brass, and the like. As such, it will be understood that the rods can be formed from a combination of materials and/or alloys such that the various portions or regions of the rod react to different transition temperatures and/or transition at different times relative to other portions or regions of the rod. For example, the active portion of each rod can be formed of a shape memory alloy while the end portions are formed of alloys which are not shape memory alloys.

Shape memory alloys exhibit thermo-mechanical properties that are useful in constructing thermally actuatable devices. Generally, a shape memory alloy is a metallic alloy that has distinctly different phases on opposing sides of a transition temperature. A shape memory alloy reaches a first physical state when it is below its transition temperature and a second physical state when it is above its transition temperature. Some shape memory alloy materials can be trained to have a first shape for the cooler first state and a second shape for the warmer second state. A two-way trained shape memory alloy can forcibly assume the second shape when heated above the transition temperature and then gently return, if not otherwise restricted, to the first shape when cooled to below the transition temperature.

Figure 6:
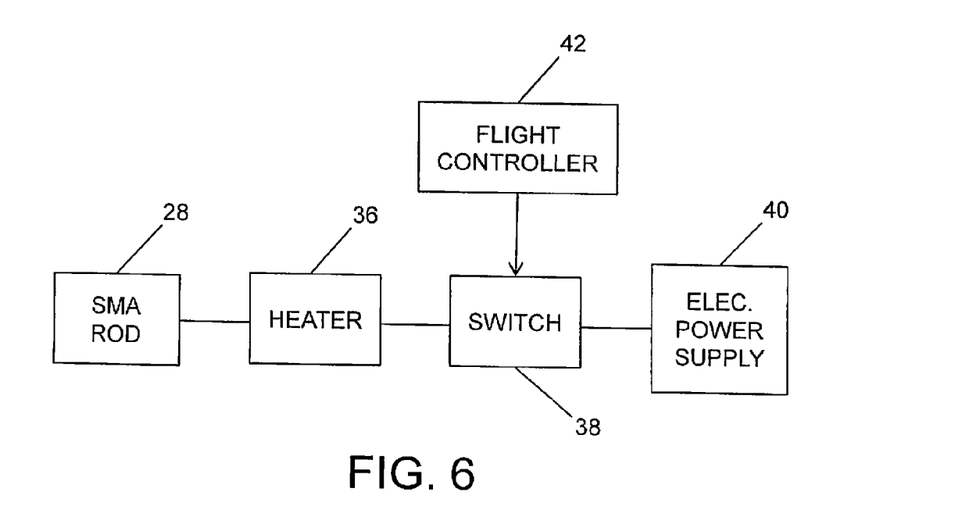
FIG. 6 is a block diagram showing components of a system for actuating a control surface of an aircraft using rods made of shape memory alloy.

FIG. 6 is a block diagram showing components of a system for actuating a control surface of an aircraft using rods made of shape memory alloy. In accordance with one embodiment of the system, each shape memory alloy (SMA) rod (for example, SMA rod 28) is thermally coupled to a respective heater 36. The heater 36 may comprise an external coil heater wrapped around the active portion of rod 28, a coil positioned to heat the active portion of rod 28 (coated with a smart susceptor material) by electromagnetic induction heating, or a plurality of internal cartridge heaters inserted into drilled holes in the active portion of each rod. (A cartridge heater is a tube-shaped joule heating element comprising a heating coil inside a sheath. As electrical current flows through the heating coil, the wire of the coil heats up, thereby heating up the sheath, and in turn heating up the shape memory alloy of the rod.) The heater 36 receives electrical power from an electrical power supply 40 via a switch 38 which is controlled by a flight controller 42.

When supplied with electrical power, the heaters 36 heat the active portion of each rod, which active portion has been trained to deform during heating, causing each rod to deform from a first shape to a second shape, which also has the effect of deforming the continuous mold line. The heaters are lightweight when compared to previously used actuators and also heat up the elastomer surrounding the rods. The proposed continuous mold line overcomes the drawbacks (discussed above) associated with known continuous mold lines. Further, the movement of the shape memory alloy rods assists in moving a component (e.g., a flap) of an aircraft such that the component can have a smaller actuator associated with it. The proposed continuous mold line can be used between a flap and a wing to reduce noise, between flap-track fairings to reduce drag, at a rudder to keep the boundary layer attached at larger angles of rudder movement, between engine exhaust petals, etc.

During use, heat is applied to the shape memory alloy rods to deform the rods when a first structure of the aircraft (e.g., a flap) needs to be moved with respect to a second structure of the aircraft (e.g., the wing) or when two structures (e.g., two engine exhaust petals) need to be moved relative to each other. When the rods are in their deformed state, the deformed elastomeric skin forms a continuous surface between the two structures. When one structure needs to be returned to its original position, the supply of heat to the rods is discontinued to allow the rods to return to their undeformed state. The periodic heating of the rods during flight warms the elastomeric skin so that the skin can return to its undeformed shape quickly when the shape memory alloy rods are cooled.

In accordance with alternative embodiments, the connection assembly may comprise a plurality of rod/sleeve assemblies, each rod/sleeve assembly comprising a single rod having a length greater than the sleeve length. This single rod is positioned inside the sleeve such that respective end portions of the rod extend outside of the sleeve. Since the sleeve is straight, the portion of the rod which slides back and forth inside the sleeve must be straight to facilitate sliding, i.e., the slidable rod portion is made of a material which does not deform during heating. For example, the slidable portion of the rod may be made of a shape metal alloy material which employs superelastic rather than shape memory properties, while adjacent portions of the rod on either side of the sleeve, which do not enter the sleeve during rod movement, are trained to deform during heating, thereby utilizing its shape memory properties in the manner described above. Also the respective end portions of each rod, which will be fastened to respective rod blocks, are also not trained to deform during heating.

While connection assemblies have been described with reference to various embodiments, it will be understood by those skilled in the art that various changes may be made and equivalents may be substituted for elements thereof without departing from the scope of the invention. In addition, many modifications may be made to adapt the teachings herein to a particular situation without departing from the scope thereof. Therefore it is intended that the claims not be limited to the particular embodiments disclosed.

The invention claimed is:

1. An assembly for connecting two relatively movable structures on an aircraft, comprising:
   first and second rigid structures;
   a flexible skin connected to said first rigid structure and to said second rigid structure;
   a first rod having a first end portion attached to said first rigid structure, said first rod comprising shape memory alloy in at least an intermediate portion thereof;
   a sleeve having first and second end portions; and
   a second rod having a first end portion connected to said second rigid structure, said second rod comprising shape memory alloy in at least an intermediate portion thereof,
   wherein a second end portion of said first rod is slidably disposed inside said first end portion of said sleeve, and a second end portion of said second rod is slidably disposed inside said second end portion of said sleeve.

2. The assembly as recited in claim 1, wherein said flexible skin is made of elastomeric material, and said first rod is embedded in said elastomeric material.

3. The assembly as recited in claim 1, wherein said flexible skin is made of fabric.

4. The assembly as recited in claim 1, wherein said first rod has a first shape when said intermediate portion of said first rod is heated and a second shape when said intermediate portion of said first rod is cooled, said second shape being different than said first state.

5. A system for connecting two relatively movable structures on an aircraft, comprising:
   a first rigid structure attached to one of the relatively movable rigid structures;
   a second rigid structure attached to another of the relatively movable structures;
   a flexible skin connected to said first and second rigid structures;
   a sleeve comprising first and second end portions;
   a first rod comprising a first end portion attached to said first rigid structure, a second end portion slidably disposed inside said first end portion of said sleeve, and an intermediate portion made of shape memory alloy;
   a second rod comprising a first end portion attached to said second rigid structure, a second end portion slidably disposed inside said second end portion of said sleeve, and an intermediate portion made of shape memory alloy; and
   means for heating at least said intermediate portions of said first and second rods.

6. The system as recited in claim 5, wherein said flexible skin is made of elastomeric material, and said first and second rods and said sleeve are embedded in said elastomeric material.

7. The system as recited in claim 5, wherein said flexible skin is made of fabric.

8. The system as recited in claim 5, wherein said first rod has a first shape when said intermediate portion of said first rod is heated and a second shape when said intermediate portion of said first rod is cooled, said second shape being different than said first state.

9. The system as recited in claim 5, wherein each of said first and second rods has a cross-sectional measurement in a range of 0.1 to 0.5 inch.

10. An aircraft comprising:
a first structure comprising a relatively rigid skin;
a second structure comprising a relatively rigid skin, at least one of said first and second structures being movable relative to the other; and
a connection assembly having a first end connected to said rigid skin of said first structure and a second end connected to said rigid skin of said second structure, said connection assembly comprising a flexible skin, a sleeve comprising first and second end portions, a first rod comprising a first end portion slidably disposed inside said first end portion of said sleeve, and a second rod comprising a first end portion slidably disposed inside said second end portion of said sleeve, wherein each of said first and second rods comprises shape memory alloy,
wherein said flexible skin of said connection assembly and said relatively rigid skins of said first and second structures define a continuous surface.

11. The aircraft as recited in claim 10, further comprising a first rod block attached to said first structure and a second rod block attached to said second structure, wherein a first end of said flexible skin and a second end portion of said first rod are attached to said first rod block, and a second end of said flexible skin and a second end portion of said second rod are attached to said second rod block.

12. The aircraft as recited in claim 10, wherein said flexible skin is made of elastomeric material, and said sleeve and said first and second rods are embedded in said elastomeric material.

13. The aircraft as recited in claim 10, wherein first structure is a fixed wing or tail and said second structure is a control surface.

14. The aircraft as recited in claim 10, further comprising at least one heating element that is thermally coupled to an intermediate portion of said first rod.

15. The aircraft as recited in claim 10, wherein said first rod has a first shape when an intermediate portion of said first rod is heated and a second shape when said intermediate portion of said first rod is cooled, said second shape being different than said first state.

16. An aircraft comprising first and second structures and a connection assembly connecting said first and second structures to each other, said connection assembly comprising:
a first rod block attached to said first structure;
a second rod block attached to said second structure;
a flexible skin having one end connected to said first rod block and another end connected to said second rod block; and
a plurality of assemblies disposed within or adjacent to said flexible skin, wherein each assembly comprises:
a sleeve;
a first rod comprising a first portion slidably disposed inside said sleeve, a second portion attached to said first rod block, and a third portion disposed between said first and second portions of said first rod, wherein said third portion of said first rod comprises shape memory alloy trained to produce a two-way memory effect in response to heating and cooling; and
a second rod comprising a first portion slidably disposed inside said sleeve, a second portion attached to said second rod block, and a third portion disposed between said first and second portions of said second rod, wherein said third portion of said second rod comprises shape memory alloy trained to produce a two-way memory effect in response to heating and cooling.

17. The aircraft as recited in claim 16, further comprising means for heating the shape memory alloy of said first and second rods.

18. The aircraft as recited in claim 16, wherein said flexible skin comprises a sheet of elastomeric material, said plurality of sleeves and said plurality of first rods being embedded in said sheet of elastomeric material.

* * * * *